United States Patent
Feno

(10) Patent No.: US 9,166,498 B2
(45) Date of Patent: Oct. 20, 2015

(54) POWER CONVERTER WITH NON-SYMMETRICAL TOTEM POLE RECTIFIER AND CURRENT-SHAPING BRANCH CIRCUITS

(71) Applicant: Power-One, Inc., Camarillo, CA (US)

(72) Inventor: Ivan Feno, Bertschikon (CH)

(73) Assignee: PAI CAPITAL LLC, Santa Clara, CA (US)

( * ) Notice: Subject to any disclaimer, the term of this patent is extended or adjusted under 35 U.S.C. 154(b) by 168 days.

(21) Appl. No.: 13/886,386

(22) Filed: May 3, 2013

(65) Prior Publication Data

US 2014/0226375 A1    Aug. 14, 2014

Related U.S. Application Data

(60) Provisional application No. 61/764,000, filed on Feb. 13, 2013.

(51) Int. Cl.
*H02M 7/219* (2006.01)
*H02M 1/42* (2007.01)

(52) U.S. Cl.
CPC ............ *H02M 7/219* (2013.01); *H02M 1/4233* (2013.01); *Y02B 70/126* (2013.01)

(58) Field of Classification Search
CPC . H02M 7/162; H02M 7/1623; H02M 7/1626; H02M 7/217; H02M 7/2176; H02M 7/219
USPC .................. 363/84, 88, 89, 90, 125, 126, 127
See application file for complete search history.

(56) References Cited

U.S. PATENT DOCUMENTS

| | | | |
|---|---|---|---|
| 7,518,895 | B2 | 4/2009 | Shekhawat et al. |
| 2008/0316775 | A1 | 12/2008 | Tsai et al. |
| 2010/0165686 | A1* | 7/2010 | Matzberger et al. .......... 363/127 |

(Continued)

FOREIGN PATENT DOCUMENTS

| EP | 2515420 A2 | 4/2012 |
|---|---|---|
| JP | 2011-142726 A | 7/2011 |
| KR | 10-2009-0024800 A | 3/2009 |

OTHER PUBLICATIONS

International Search Report in corresponding International Application No. PCT/US2014/015813, dated May 26, 2014, 3 pp.

*Primary Examiner* — Gary L Laxton
(74) *Attorney, Agent, or Firm* — Patterson Intellectual Property Law, P.C.; Mark J. Patterson; Gary L. Montle

(57) ABSTRACT

A hybrid diode-less power converter topology of the present invention converts power from an AC power source to a variable load with high efficiency. The power converter includes a non-symmetrical arrangement of rectifying switches for rectifying an input AC voltage and shaping switches for shaping an input AC current. The shaping switches are operated in Continuous Conduction Mode (CCM) based on an input AC current. Operation of each of the rectifying switches and shaping switches are further controlled wherein a commutation time for the shaping switches is associated with a first voltage rise and fall time (e.g., less than 10 ns), and a commutation time for the rectifying switches is associated with a second voltage rise and fall time (e.g., at least 100 ns), wherein the first voltage rise and fall time is less than the second voltage rise and fall time by a factor of nine or more.

20 Claims, 7 Drawing Sheets

(56) References Cited

U.S. PATENT DOCUMENTS

| | | |
|---|---|---|
| 2011/0012579 A1 | 1/2011 | Huang |
| 2013/0063996 A1* | 3/2013 | Nakao .......................... 363/127 |
| 2013/0215657 A1* | 8/2013 | Heath et al. .................... 363/127 |
| 2014/0104910 A1* | 4/2014 | Kwong et al. ................. 363/127 |

* cited by examiner

POWER CONVERTER WITH NON-SYMMETRICAL TOTEM POLE RECTIFIER AND CURRENT-SHAPING BRANCH CIRCUITS

CROSS-REFERENCES TO RELATED APPLICATIONS

This application claims benefit of the following patent application(s) which is/are hereby incorporated by reference: U.S. Provisional Patent Application No. 61/764,000 filed Feb. 13, 2013.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

This invention relates generally to the field of electrical power conversion, and more particularly to high efficiency rectifier solutions.

A totem pole rectifier is a known bridge-less circuit used to rectify an AC line input voltage. It is understood as a solution with potential for highest achievable efficiency (>99%). Conventional versions of totem-pole rectifier circuits include those shown on FIG. 1 to FIG. 3.

An important feature of the totem pole rectifying circuit is that it is not only a bridge-less (BL) solution, but also possibly a diode-less solution. As such, it can incorporate no forward voltage drop devices, which means it can provide very high efficiency at light load conditions. Another important advantage is its compactness because the number of components is low when compared with most other bridge-less circuits. This feature is even more remarkable if CCM (Continuous Conduction Mode) method would be used to control switches to provide high power handling capability. However, there are several limitations which make this solution relatively difficult to implement, and as a result it has not been widely adopted and used.

A first possible implementation of this topology is represented in FIG. 1. It consists of two rectifying diodes 1 and 2 and a shaping branch with MOSFETs 3 and 4 which are operated so that a current through smoothing inductor 101 is shaped to follow a predefined reference. Because diodes 1 and 2 are forward-drop featured devices, this circuit is not a true diode-less solution and does not provide significant advantages when compared with other BL circuits.

Another implementation is represented on FIG. 2. This true diode-less topology includes two rectifying MOSFETs 5 and 6 and two shaping MOSFETs 7 and 8. While this solution benefits from the diode-less character of the circuit, it does, however, feature a significant disadvantage. Slow body diodes of MOSFETs 7 and 8 significantly deteriorate the potential of the circuit in CCM by excessive reverse recovery current that induces high switching losses and may decrease the MOSFETs reliability when CCM control method is used. This effect can be slightly enhanced by using MOSFETs with fast body diode, but with current state-of-the-art devices this does not achieve a significant improvement in efficiency over other conventional BL solutions.

To overcome this problem, there are three basic possibilities known from the prior art.

A first option is to control the shaping switches 7 and 8 with BCM (Boundary Conduction Mode), e.g., at the border of DCM (Discontinuous Conduction Mode) where current through a smoothing inductor 9 periodically falls to zero at the end of switching period, and at this instant the next switching cycle is initiated. An optimized version of this method implements a valley switching technique and hence further decreases capacitive turn-on losses. This method significantly decreases reverse recovery current of body diodes inherently contained in Silicon MOSFETs 7 and 8.

A second option is an extension of the BCM method described in above, where current through smoothing inductor 9 is forced to go negative to achieve ZVS switching for shaping switches 7 and 8 in the entire range of load 11 and the input AC voltage 21.

A third option is to use IGBTs 10-13 instead of MOSFETs as represented in FIG. 3. This solution provides (and requires) the possibility to equip the switching devices with anti-parallel ultra-fast diodes 14-17 because IGBTs inherently do not contain them, and hence it reduces reverse recovery losses.

Each of the three above-mentioned solutions suffer from other problems, however.

Power Density:

When a converter according to FIG. 2 is controlled at the boundary of DCM (BCM), the power handling capability is lower than its CCM controlled counterparts due to the fact that current in the smoothing choke 9 is periodically forced to fall to zero, and hence a high level of power density is difficult to achieve. Power handling in the case of BCM controlled converters can be increased by adding more phases to obtain an interleaved two or more phase converter. This method increases the power handling but still does not provide a very compact solution. In addition, obtaining the proper phase shift between two or more phases for each instantaneous input AC voltage within a half-period and for each load condition is not a trivial task because of varying switching frequency within the input AC voltage cycle. One possible way to handle this is disclosed in Ziegler et al. "Digital Phase Adjustment for Multiphase Power Converters", U.S. Patent Application Publication No. 2012/0218792, filed Feb. 10, 2012.

Circulating Energy:

When a converter according to FIG. 2 is controlled at the boundary of DCM (BCM), a circulating energy is present in the circuit due to the oscillation between the choke 9 and output capacitance Coss of the MOSFETs 7 and 8. If Cool-MOS devices are used with significant Coss=f(Vds) functional dependency, reverse current flowing through choke 9 required to achieve valley or ZVS switching has a quasi-triangular shape and is characterized with high peak amplitude. This increases conduction losses and decreases efficiency at light loads even though a ZVS technique recycles energy stored in output capacitance Coss of switches 7 and 8. Typical waveforms recorded on the totem pole converter according to FIG. 2 and controlled by BCM are represented on FIG. 4. These waveforms correspond to a valley switching technique during frequency limit mode where negative current is obtained only by natural oscillation between inductor 9 and the Coss capacitance of MOSFETs 7 and 8. The amplitude of the oscillation current is about 1 A. Taking into account a targeted 99% efficiency, the power loss associated with this negative current and related circulating energy is high.

Total Harmonic Distortion (THD):

Another consequence of the larger negative current peak flowing through choke 9 that exists during valley switching, and is even larger in the case full ZVS behavior is targeted, is significant deterioration of input current THD when a standard constant on-time method is used within BCM control method. Typical waveforms recorded on the totem pole converter according to FIG. 2 and controlled by BCM are represented on FIG. 5. Negative peak current flowing through choke 9 is increased when the input AC voltage 10 approaches zero. This is directly given by a small positive di/dt and a large negative di/dt of the input current because the slope of current rise/fall is given by a voltage applied on the smoothing choke. In general, to enhance THD, the on-time of the shaping switches 7 and 8 must be varied as a function of the input AC voltage 10 and a load 11, as modeled on FIG. 6.

This functional dependency is given purely by parasitic circuit elements, namely Coss nonlinearity of shaping FETs 7 and 8 and the inductance of the choke 9. It is derived analytically by solving the non-linear system of parametric differential equations given by the strong non-linearity Coss=Coss (Vds) where the parameters are immediate input AC voltage 10 and the load 11. An alternative method based on HW interaction between a control machine and a power stage is disclosed in Ziegler et al. "Input Current Shaping for Transition and Discontinuous Mode Power Converter", U.S. Patent Application Publication No. 2012/0212276, filed Feb. 10, 2012, describing a method and apparatus to handle deteriorated THD. The method is normally required to be running on a FPGA or ASIC to process the algorithm for the proper on-time generation.

Driving Power:

Driving energy consumption is also not negligible since two shaping MOSFETs need to be driven. Taking into account a targeted >99% efficiency, this part of permanent losses plays an important role in the loss budget and consequently shifts the efficiency curve down.

IGBT:

A circuit according to FIG. 3 offers in contrast high power handling due to CCM capability. However, the bipolar character of IGBT Ic vs. Vice output characteristics with typical forward-drop voltage and significant dynamic "tail current" losses cannot offer better efficiency as compared with a ZVS/valley controlled converter according to FIG. 2. This is especially valid for converters with 400V class DC bus voltage where 600V devices are normally considered.

Electromagnetic Compatibility (EMC):

The rectifying switches 5-6 are commutated each time the zero crossing of the input AC voltage 10 is detected. Typically, the DC bus rails have a parasitic or intended (by means of Y2 capacitors) capacitance 18 referred to a common ground 19. In this case, the commutation of the rectifying switches 5 and 6 causes a common mode (CM) voltage with an amplitude of DC bus voltage (present on capacitor 20) seen on input terminals 21. This rectangular CM voltage features low fundamental frequency equal to frequency of the input AC voltage 10, high amplitude and wide frequency spectrum. Because of that, total EM behavior of the converter is deteriorated.

What is need then are a method and apparatus to effectively overcome above mentioned disadvantages.

BRIEF SUMMARY OF THE INVENTION

In one exemplary embodiment, a hybrid diode-less power converter topology of the present invention converts power from an AC power source to a variable load with high efficiency. The power converter includes a non-symmetrical arrangement of rectifying switches for rectifying an input AC voltage and shaping switches for shaping an input AC current. The shaping switches are operated in Continuous Conduction Mode (CCM) based on an input AC current. Operation of each of the rectifying switches and shaping switches are further controlled wherein a commutation time for the shaping switches is associated with a first voltage rise and fall time (e.g., less than 10 ns), and a commutation time for the rectifying switches is associated with a second voltage rise and fall time (e.g., at least 100 ns), wherein the first voltage rise and fall time is less than the second voltage rise and fall time by a factor of nine or more.

DETAILED DESCRIPTION OF THE INVENTION

Figure 1:
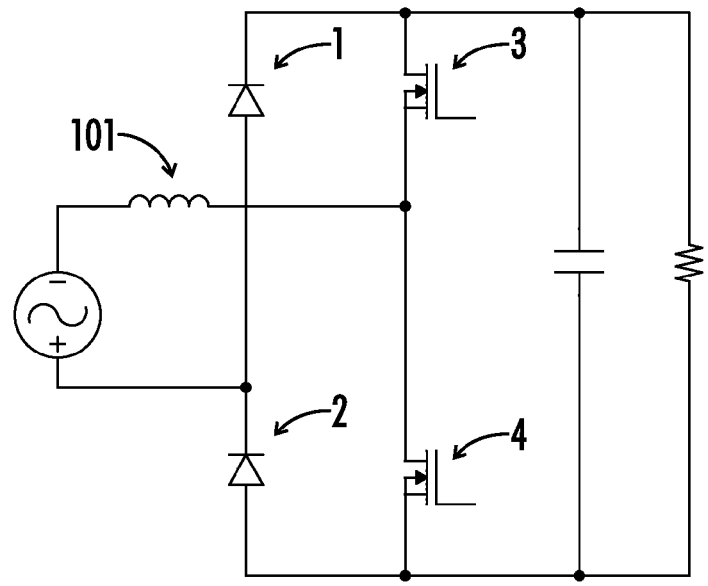
FIG. 1 is a simplified schematic of a conventional totem pole rectifier circuit with a passive rectifier branch.
Figure 2:
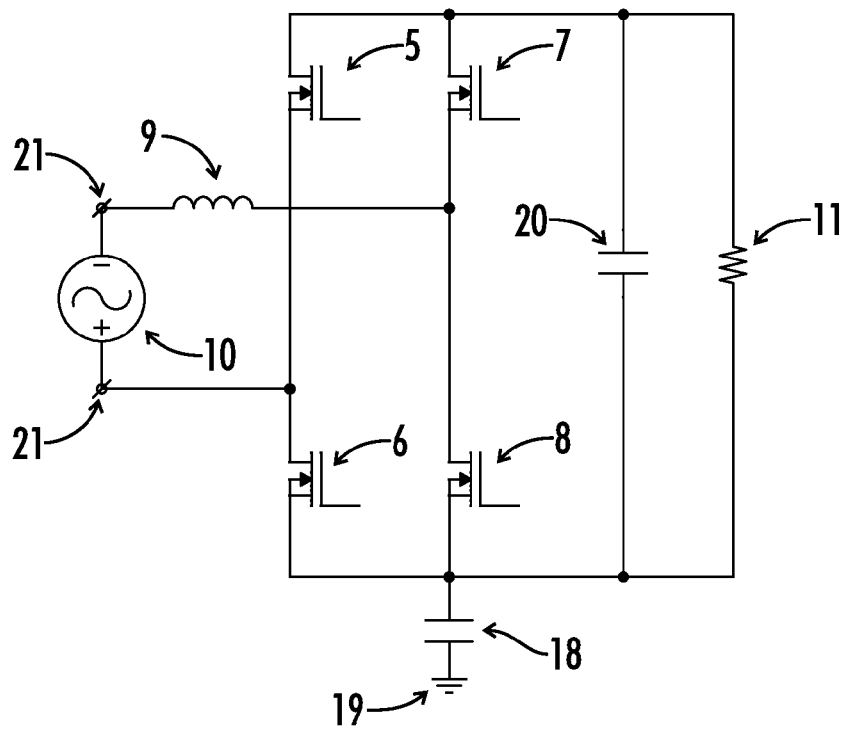
FIG. 2 is a simplified schematic of a conventional totem pole rectifier circuit with an active rectifier branch.
Figure 3:
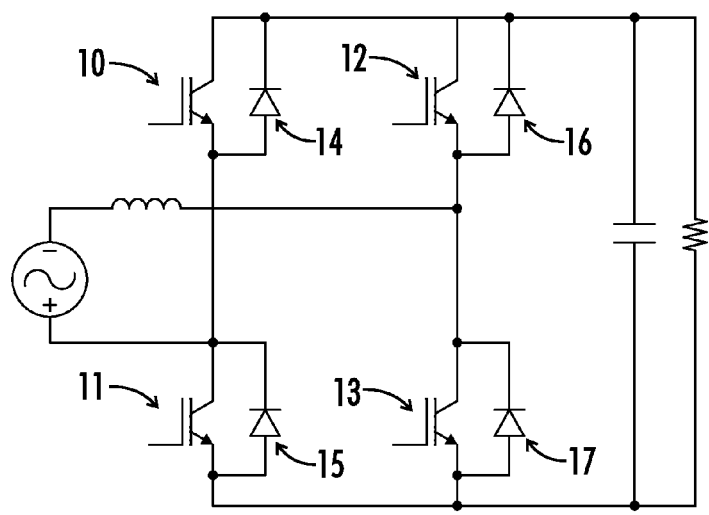
FIG. 3 is a simplified schematic of a conventional totem pole rectifier circuit equipped with IGBTs and fast recovery diodes.
Figure 4:
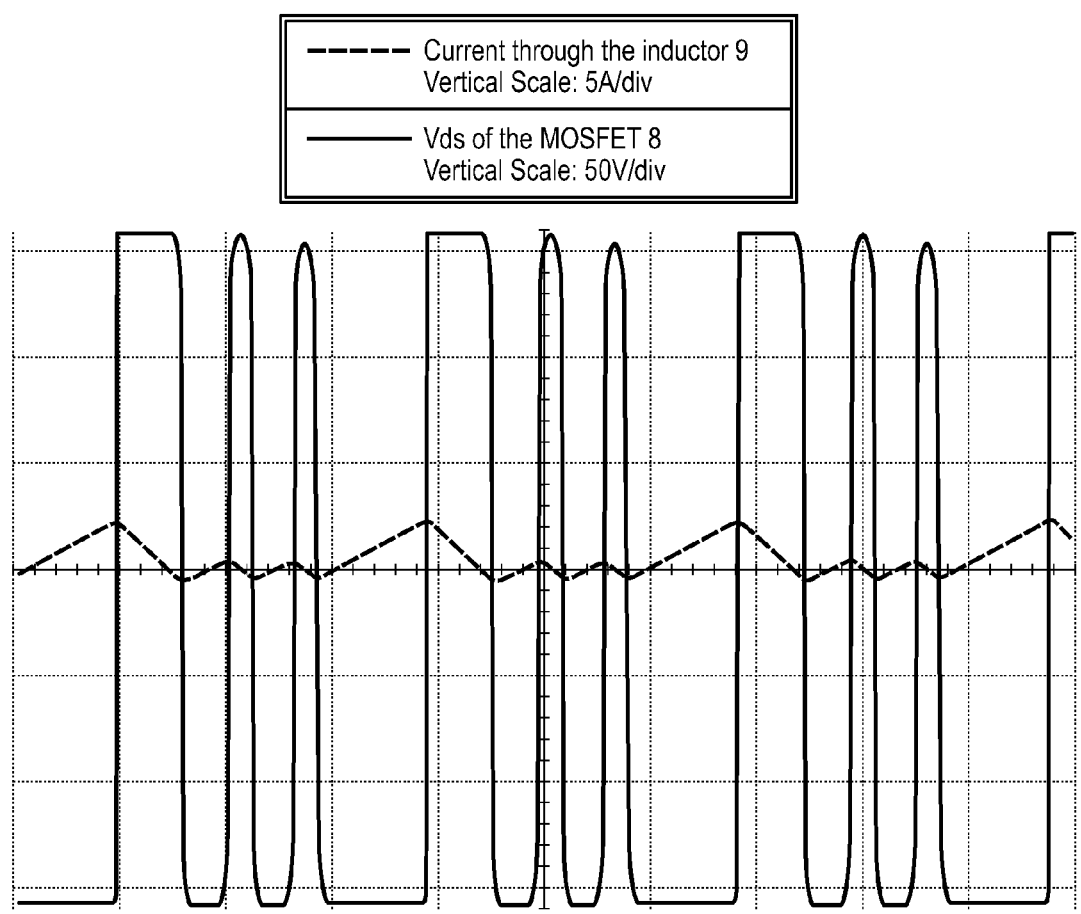
FIG. 4 shows typical waveforms recorded on the totem pole converter according to FIG. 2 and controlled by BCM.
Figure 5:
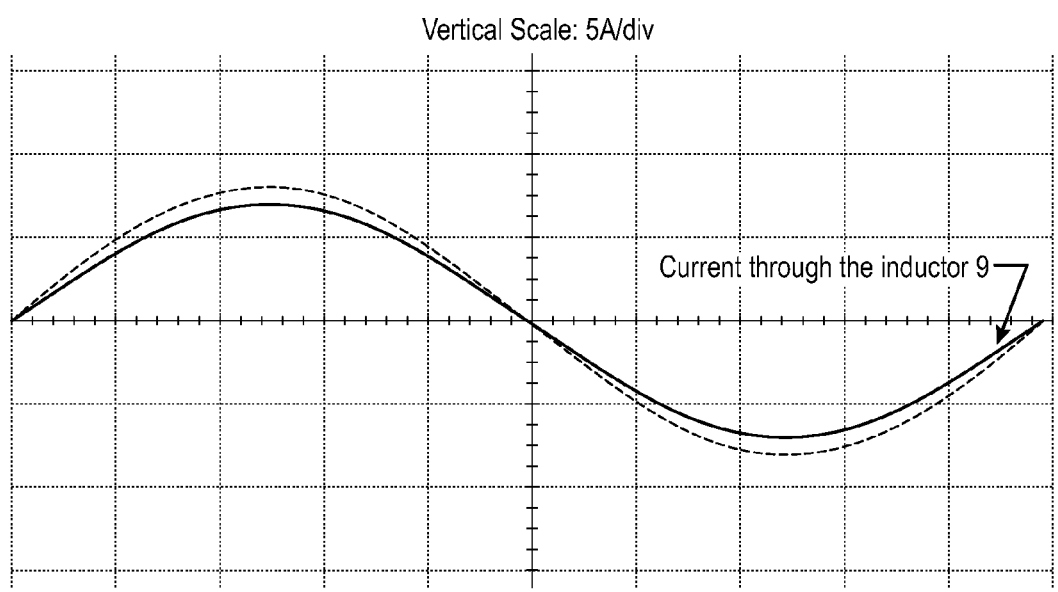
FIG. 5 shows typical waveforms recorded within the AC input voltage period on the totem pole converter according to FIG. 2 and controlled by BCM.
Figure 6:
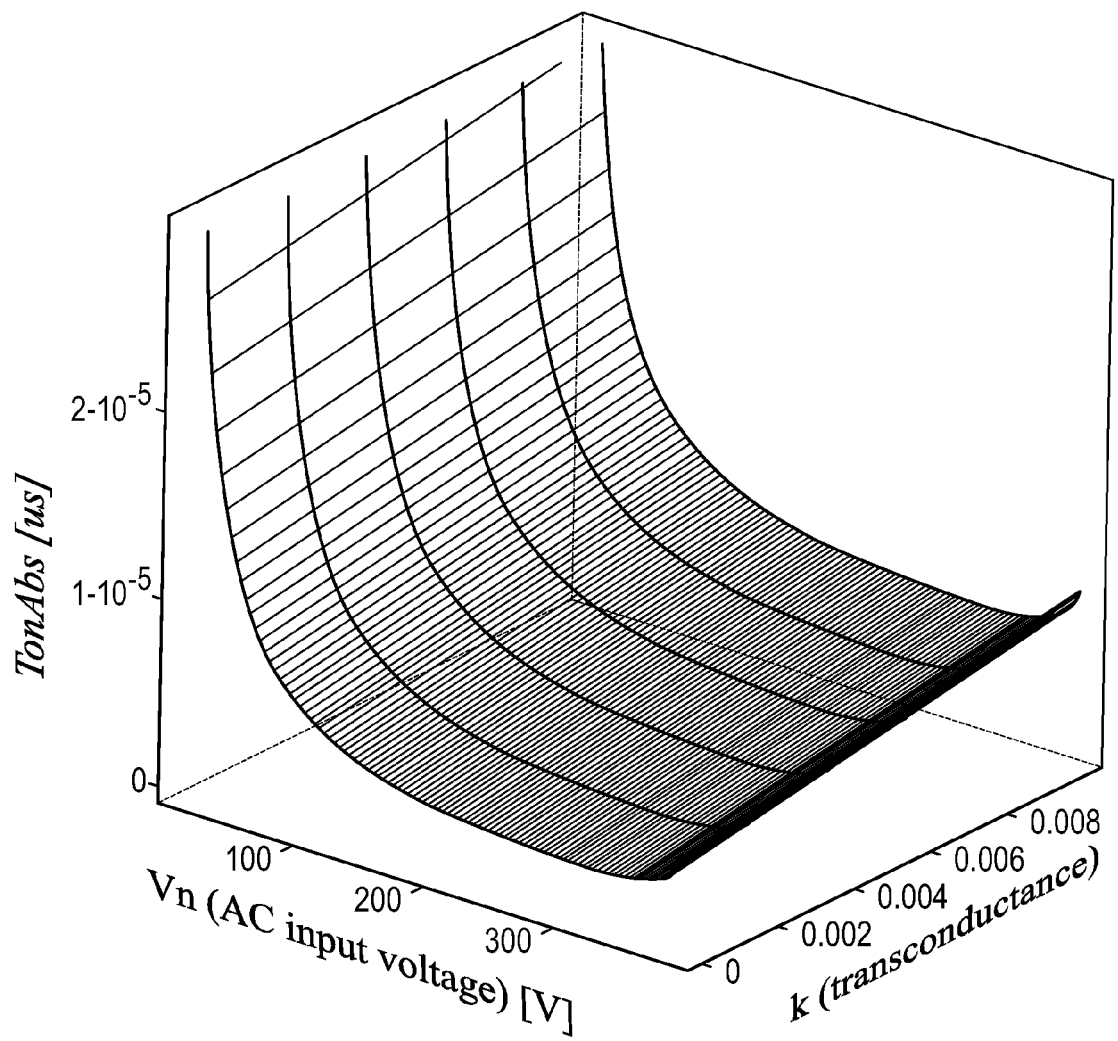
FIG. 6 shows that the on-time of the shaping switches 7 and 8 in the circuit of FIG. 2 must be varied as a function of the input AC voltage 10 and a load 11, as modeled on FIG. 6.
Figure 7:
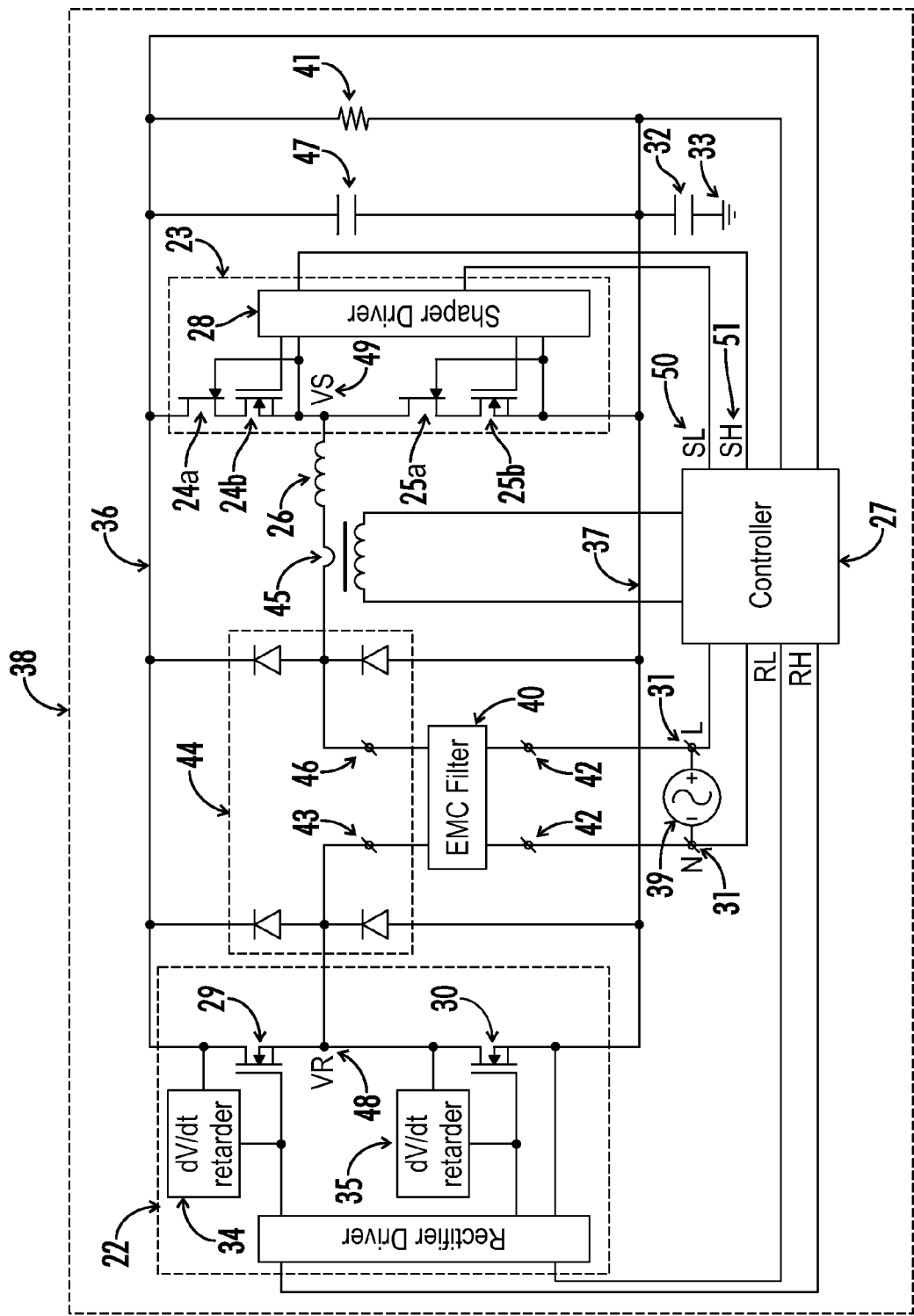
FIG. 7 is a simplified schematic of an HDLC circuit according to one embodiment of the present invention.

An embodiment of a Hybrid Diode-less Converter ("HDLC") 38 according to the present invention is disclosed in FIG. 7.

In contrast to the prior art, where rectifying switches and shaping switches form a symmetrical structure, the HDLC architecture includes two branches, both featured by essentially different characteristics in terms of physical structure and also in terms of control method. The circuit architecture includes a silicon based rectifying branch 22 with essentially slowed-down switching behavior and a hybrid shaping branch 23 with a very high speed switching performance. Prior art totem pole rectifiers are mostly controlled with a BCM method where the current through smoothing choke is forced to fall periodically to zero (valley switching method) or to a predetermined negative current (ZVS technique). In comparison, the shaping switches 24 and 25 in the HDLC are essentially controlled by a CCM method. By doing this, the HDLC gains power density over prior art totem pole or other bridge-less rectifiers by using only one smoothing choke 26 operated in CCM. To reach over 99% conversion efficiency, the shaping branch 23 is configured to exhibit excellent high speed switching performance in hard switching conditions. This requirement includes very fast voltage and current rise and fall times, and in addition very low stored charge during both the off state and the on state. For practical application, voltage/current rise/fall time must be below 10 ns while the shaping switches must not exhibit excessive charge during this fast commutation process.

To achieve this, an embodiment of the HDLC includes the shaping switches where the switch is a High Electron Mobility Transistor ("HEMP") 24a/25a and a low voltage MOSFET 24b/25b connected in a cascode configuration. The HEMT is a lateral device consisting of a heterojunction inducing 2D electron gas featuring high mobility electrons. This 2D electron gas is induced already in off-state conditions and forms a normally-on device. The cascode configuration provides RF speed of the HEMT and an easy interface between a driving signal and the normally-on HEMT.

In an alternative embodiment of the HDLC, the cascode configured HEMT and MOSFET switches are integrated in a single physical package to provide low parasitics and a highly rugged power stage.

Another embodiment of the invention may include a normally-off HEMT instead of the cascode configuration. The shaping branch 23 formed by the HEMT devices is capable of meeting the speed requirements and operates with voltage rise/fall time in a range of 4-8 ns. This level of switching speed provides high dV/dt on a VS node 49 in a range of 50-100 V/ns, which requires highly demanding layout design for the power section of the circuit 38 and also for the driving section 28.

Taking into account that the controller 27 generates control signals 50 and 51 to operate both shaping switches, it is beneficial to decrease the dead time 52 (FIG. 8) between signals 50 and 51 below 50 ns to fully harvest the high speed potential of HEMT devices in the shaping branch 23. This setting is, however, dependent on the timing tolerance specified for respective driving circuits 28. The HEMT devices also feature very low gate charge which in a cascode configuration is given by the low voltage MOSFETs 24b/25b gate characteristics. Compared with their silicon counterparts, gate drive power consumption required to operate an HEMT equipped shaping branch is considerably lower and provides increased efficiency at lower load conditions.

Another distinction with respect to the prior art is the architecture and the control of the rectifying branch 22, including switches 29 and 30. If a standard method to control the rectifying switches (turn-off/dead time/turn-on) is used here then the circuit exhibits wide-band CM voltage present at the input terminals 31 associated with charging/discharging the total capacitance 32 between DC bus rails 36/37 and the common ground 33. To avoid this, one embodiment of the present invention includes rectifying switches equipped with dv/dt retarders 34 and 35 acting as slow-down elements for the rectifying switches 29 and 30. Each retarder includes a series combination of a resistor and a capacitor in which the resistor value range includes zero resistance.

In an alternative embodiment, significantly large gate drive resistors are used. Both embodiments essentially decrease dV/dt on a VR node 48 generated by the rectifying branch 22 so that the rectifying switches 29 and 30 feature voltage rise/fall times 55 (FIG. 8) of 100 ns or more, which is significantly slower than the normal speed of a typical state-of-the-art Si super-junction MOSFETs. As a result, DC bus rails 36/37 change their potential to common ground 33 gradually and in a controlled way within the entire commutation time 55 which decreases the high frequency content of CM voltage injected into the input terminals 31 of the converter. The effect of both embodiments is shown on FIG. 8, where waveform 53 is typical for embodiments with retarders 34 and 35, while waveform 54 is typical for an embodiment with extra large gate drive resistors.

To summarize, an important feature of the HDLC circuit is an essential unbalance between the character of the shaping branch and the rectifying branch in terms of the physical structure and the control method. As a result, the HDLC features many advantages over prior art, which may include for example high power density enabled by the single CCM operated smoothing choke, essentially no circulating energy required in ZVS/ZCS converters, low THD provided by CCM method, low driving consumption enabled by the small gate charge of HEMT devices, and optimized EMC behavior given by controlled dV/dt transition of the rectifying branch.

Figure 8:
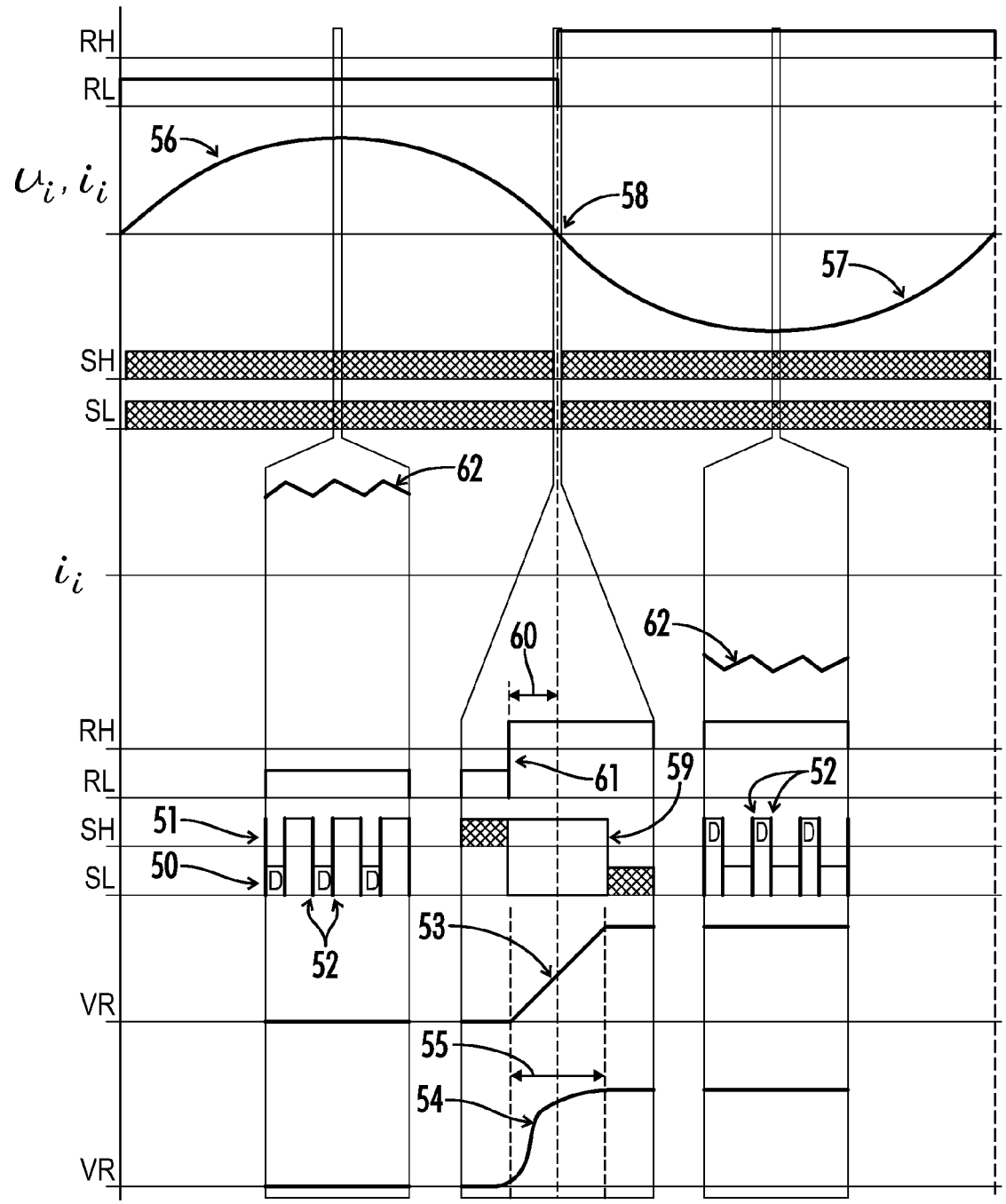
FIG. 8 shows waveforms representing operation of the circuit of FIG. 7.

Operation of the HDLC can be described by reference to FIG. 7 and FIG. 8. The input AC voltage 39 is first connected to input terminals 42 of the EMC filter 40 to decouple disturbances generated by the rectifying branch 22, the shaping branch 23 and a load 41. The output terminals 43 and 46 of the EMC filter 40 are connected to the HDLC power stage while some embodiments incorporate a protective bridge 44 formed by silicon diodes to protect the power stage against surge voltages and surge currents. In contrast to prior art, in an embodiment of the HDLC, no diode in the protective bridge 44 conducts current during normal operating conditions because the current is flowing through the rectifying branch 22 and shaping branch 23 and hence no power loss is generated in bipolar silicon diodes of the protective bridge 44. The diodes in the protective bridge 44 go into conduction only in case of high input current due to overload or a transient voltage surge present on the output terminals 43 and 46 of the EMC filter 40.

A phase pole 46 is further connected to an input current sensing element 45 to sense the input current and is then connected through the smoothing choke 26 to the shaping branch 23. In an embodiment of the invention, the input current sensing element includes of a full-wave operated current transformer effective to sense the current through the choke 26 at the same frequency as the input AC voltage frequency. A person skilled in the art will understand that the current sensing element 45 can be realized also in a different way and still be within the scope of this invention. A neutral pole 43 is connected directly to the rectifying branch 22. Both the rectifying branch 22 and the shaping branch 23 are connected to DC bus rails 36 and 37 while the DC bus voltage is clamped by capacitor 47. The load represented by resistor 41 is connected in parallel to capacitor 47.

The controller 27 measures the input AC voltage polarity and in case it is positive (56) then the signal RL is active and the signal RH is passive providing the switch 30 is on and the switch 29 is off. Note that the input AC voltage is positive if the potential of the phase pole 46 is higher than the potential of the neutral pole 43. If input AC voltage is negative (57) then the signal RL is passive and the signal RH is active providing the switch 29 is on and the switch 30 is off. Switch-over between switches 29 and 30 takes place when the input AC voltage polarity change is detected (58).

Because the commutation process of the rectifying branch 22 is essentially long (55), the signals RL and RH feature advanced commutation 60 to minimize the input current zero crossing distortion. To avoid cross conduction in the rectifying branch 22 both signals feature a dead time 61.

The controller 27 further senses the input current and with a CCM method operates respective switches in the shaping branch 23 by means of signals 50 and 51 so that the input current 62 flowing through smoothing choke 26 follows the reference internally generated in the controller 27.

When the input AC voltage is positive (56), the signal 50 operates the switch 25 with duty cycle D and the signal 51 operates the switch 24 with duty cycle 1-D. In this case the switch 24 realizes synchronous rectification functionality.

When the input AC voltage polarity is negative (57) the controller 27 exchanges duty cycle control so that the signal 51 operates the switch 24 with duty cycle D and the signal 50 operates the switch 25 with duty cycle 1-D. In this case, the switch 25 realizes synchronous rectification functionality. In both cases, signals 50 and 51 are generated in complementary fashion with short dead time 52.

At the same time, when an input AC polarity change 58 is detected, signals 50 and 51 are deactivated (59) with advance 60 and the controlled commutation process 53/54 of the rectifying branch 22 featuring commutation time 55 is initiated as was described above. When the commutation process of the rectifying branch 22 is finished, signals 50 and 51 are activated again but with exchanged duty cycle control as described above. Signals 50 and 51 are characterized by short dead time 52 and during input AC voltage zero crossing 58 the signals features the long zero crossing dead time 59 with similar length as the commutation time 55 of the rectifying branch 22.

The previous detailed description has been provided for the purposes of illustration and description. Thus, although there have been described particular embodiments of the present invention of a new and useful "POWER CONVERTER WITH NON-SYMMETRICAL TOTEM POLE RECTIFIER AND CURRENT-SHAPING BRANCH CIRCUITS," it is not intended that such references be construed as limitations upon the scope of this invention except as set forth in the following claims.

What is claimed is:

1. An apparatus for converting power from an AC input source to a variable load, the apparatus comprising:
    a plurality of rectifying switches effective to rectify an input AC voltage;
    a plurality of shaping switches effective to shape an input current;
    a controller functionally linked to each of the rectifying switches and shaping switches, the controller effective to operate the rectifying switches based on the input AC voltage, and to operate the shaping switches in Continuous Conduction Mode (CCM) based on an input AC current,
    wherein a commutation time for the shaping switches comprises a first voltage rise and fall time and a commutation time for the rectifying switches comprises a second voltage rise and fall time, and the first voltage rise and fall time is less than the second voltage rise and fall time by a factor of nine or more.

2. The apparatus of claim 1, wherein the first voltage rise and fall time is less than 10 ns.

3. The apparatus of claim 1, wherein the second voltage rise and fall time is longer than 100 ns.

4. The apparatus of claim 3, further comprising a voltage rise and fall time retarder circuit coupled to each of the rectifying switches.

5. The apparatus of claim 4, wherein each rise and fall time retarder circuit is coupled between a drain and a source of a respective rectifying switch, and each retarder circuit comprises a series combination of a resistor and a capacitor wherein a resistance range of the resistor includes zero resistance.

6. The apparatus of claim 3, further comprising large gate drive resistors each comprising a resistance larger than 50 Ohms coupled to each of the rectifying switches for providing the second voltage rise and fall time.

7. The apparatus of claim 1, wherein the controller is effective to provide two complementary signals featuring a dead time shorter than 50 ns to operate the shaping switches.

8. The apparatus of claim 7, wherein the complementary signals further feature a dead time larger than 100 ns taking place during the input AC voltage zero crossing.

9. The apparatus of claim 7, wherein a duty cycle control for complementary signals is crossed over when the input AC voltage changes polarity.

10. The apparatus of claim 1, wherein the controller is effective to provide two complementary signals to operate the rectifying switches, the signals operating the rectifying switches further comprising:
    an advanced commutation process to compensate for the input current zero crossing distortion;
    a dead time to avoid a cross conduction between the rectifying switches;
    a pulse width less than half-period of the input AC voltage; and
    synchronous correlation with the input AC voltage.

11. The apparatus of claim 1, further comprising a diode bridge effective to clamp the input AC voltage during input over-voltage or over-current conditions, the diode bridge not contributing to current conduction during normal operating conditions.

12. The apparatus of claim 1, further comprising a current sensing element, the current sensing element comprising a full wave operating current transformer effective to sense the current through a smoothing choke at the same frequency as an input AC voltage frequency.

13. An apparatus for converting power from an AC input source to a variable load, the apparatus comprising:
    a choke effective to smooth an input AC current;
    an output bus capacitor effective to filter an output voltage to the variable load;
    a current sensing element, the current sensing element comprising a full wave operating current transformer effective to sense the current through the choke at the same frequency as an input AC voltage frequency;
    first and second rectifying switches effective to rectify an input AC voltage;
    a voltage rise and fall time retarder circuit coupled between a drain and a source of each rectifying switch, each retarder circuit further comprising a series combination of a resistor and a capacitor wherein a resistance range of the resistor includes zero resistance;
    first and second shaping switches effective to shape the input AC current, wherein the shaping switches are controlled with Continuous Conduction Mode (CCM) method; and
    a controller functionally linked to each of the rectifying switches and shaping switches, the controller effective to operate the rectifying switches based on the input AC voltage, and to operate the shaping switches in Continuous Conduction Mode (CCM) based on the input AC current,
    wherein a commutation time for the shaping switches comprises a first voltage rise and fall time and a commutation time for the rectifying switches comprises a second voltage rise and fall time, and the first voltage rise and fall time is less than the second voltage rise and fall time by a factor of nine or more.

14. The apparatus of claim 13, further comprising a hybrid semiconductor technology, the hybrid semiconductor technology characterized by silicon rectifying switches and HEMT-based shaping switches.

15. The apparatus of claim 13, wherein each shaping switch comprises cascode arranged switches, each cascode arranged switch comprising a normally-on HEMT connected in series with a low voltage Silicon MOSFET.

16. The apparatus of claim 15, wherein each HEMT-based switch comprises a normally-off GaN HEMT.

17. A method of converting power from an AC input source to a variable load, the method comprising:
    operating a plurality of rectifying switches to rectify an input AC voltage;

operating a plurality of shaping switches in Continuous Conduction Mode to shape an input AC current;

controlling operation of the switches wherein a commutation time for the shaping switches comprises a first voltage rise and fall time and a commutation time for the rectifying switches comprises a second voltage rise and fall time, and the first voltage rise and fall time is less than the second voltage rise and fall time by a factor of nine or more.

18. The method of claim 17, wherein the first voltage rise and fall time is less than 10 ns and the second voltage rise and fall time is longer than 100 ns, and further wherein controlling operation of the switches further comprises providing two complementary signals featuring a dead time shorter than 50 ns to operate the shaping switches.

19. The method of claim 18, wherein the complementary signals further feature a dead time larger than 100 ns taking place during the input AC voltage zero crossing.

20. The method of claim 17, wherein controlling operation of the switches further comprises providing two complementary signals to operate the rectifying switches in accordance with:
- an advanced commutation process to compensate for the input current zero crossing distortion,
- a dead time to avoid a cross conduction between the rectifying switches,
- a pulse width less than half-period of the input AC voltage, and synchronous correlation with the input AC voltage.

* * * * *